United States Patent
Sundaram et al.

(10) Patent No.: US 8,996,509 B1
(45) Date of Patent: Mar. 31, 2015

(54) QUERY RESULTS ENHANCEMENT THROUGH AGENT INTERACTION

(75) Inventors: Sridhar Sundaram, Bangalore (IN); Chandramouli Banavara Narasimhamurthi, Bangalore (IN); S. Srikanth Belwadi, Bangalore (IN); Quazi Sarfaraz Hussain, Bangalore (IN)

(73) Assignee: Google Inc., Mountain View, CA (US)

( * ) Notice: Subject to any disclaimer, the term of this patent is extended or adjusted under 35 U.S.C. 154(b) by 1250 days.

(21) Appl. No.: 12/203,421

(22) Filed: Sep. 3, 2008

Related U.S. Application Data

(60) Provisional application No. 60/969,674, filed on Sep. 3, 2007.

(51) Int. Cl.
*G06F 17/30* (2006.01)

(52) U.S. Cl.
CPC .............................. *G06F 17/30867* (2013.01)
USPC .......................... 707/722; 707/723; 707/732

(58) Field of Classification Search
CPC .............................................. G06F 17/30867
USPC ........................................ 707/722, 723, 766
See application file for complete search history.

(56) References Cited

U.S. PATENT DOCUMENTS

2003/0050924 A1*  3/2003  Faybishenko et al. ............ 707/3
2004/0249951 A1*  12/2004  Grabelsky et al. ............ 709/227

OTHER PUBLICATIONS

Jini—Wikipedia, the free encyclopedia [online], (retrieved on Mar. 25, 2009). Retrieved from the Internet: <URL: http://en.wikipedia.org/wiki/jini>, 3 pages.
Jini Architecture Specification [online], (retrieved on Mar. 25, 2009). Retrieved from the Internet: http://www.jini.org/wiki/Jini_Architecture_Specification, 15 pages.

* cited by examiner

*Primary Examiner* — Hosain Alam
*Assistant Examiner* — Johnese Johnson
(74) *Attorney, Agent, or Firm* — Fish & Richardson P.C.

(57) ABSTRACT

An agent interaction request received from a user of a client device is sent to one or more identified agents based on agent selection criteria. Agent selection criteria can include an agent bid amount. One or more responses to the agent interaction request can be received from the identified agents and sent to the user.

28 Claims, 11 Drawing Sheets

AGENT INTERACTION REQUEST

Tell us specifically what you are looking for:

I need a half dozen yellow roses delivered to 1180 Peachtree Street by 3:00 PM today for $35 or less by credit card over the phone.

206

How should we contact you?
- ● email
- ○ text message  } 208 johnsmith@someisp.com

209

How many responses do you want to receive?

3 ▲▼

210    212

Send Request

214
What is this?

QUERY RESULTS ENHANCEMENT THROUGH AGENT INTERACTION

CROSS-REFERENCE TO RELATED APPLICATIONS

This Application claims priority under 35 U.S.C. §119(e) to U.S. Provisional Application Ser. No. 60/969,674 filed on Sep. 3, 2007, the disclosure of which is incorporated herein by reference.

BACKGROUND

The Internet has grown from a sparse collection of interconnected research institutions into a vast global network including information on nearly any topic imaginable. The sheer volume of the information that is available can sometimes present problems in obtaining desired information. Internet search engines offer a solution for finding desired information by providing a user interface for performing a search of a periodically updated index of information available on the Internet. Search engines generally accept one or more keywords from users, identify a set of results based on a comparison of the keywords to one or more indices, and return a list of identified results, such as web page URLs, to the user.

Search engines can aid greatly in locating information, but in some instances the search results provided either do not include the sought for information and/or the sought for information can not easily be discerned from the query result listings. For example, a simple single keyword search can return hundreds or even thousands of listings, while a detailed multiple keyword search may not return any results at all. Performing a series of searches with progressively narrowing keyword scope can sometimes be effective, but often there is a threshold at which there is concern that valid results are being omitted, and in some cases the sought for information may not be available on the Internet at all due to its specificity.

SUMMARY

This specification describes technologies relating to providing one or more responses to an agent interaction request to a user.

In general, one aspect of the subject matter described in this specification can be embodied in methods that include the actions of receiving an agent interaction request including request text, identifying a set of agents based on agent selection criteria, ranking the set of identified agents, assigning identified agents in the set of identified agents to one of a plurality of timeslots based respective ranking scores of the identified agents, sending the agent interaction request to one or more identified agents assigned to a first timeslot, and following the end of a time period represented by the first timeslot, sending the agent interaction request to one or more identified agents assigned to a second timeslot.

Particular embodiments of the subject matter described in this specification can be implemented to realize one or more of the following advantages. The invention can provide a convenient method of obtaining additional information that is not provided by a set of search results. In addition, the invention can monetize the time value of a business lead through a bid-based ranking system that provides business leads to according to a timeslot assignment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
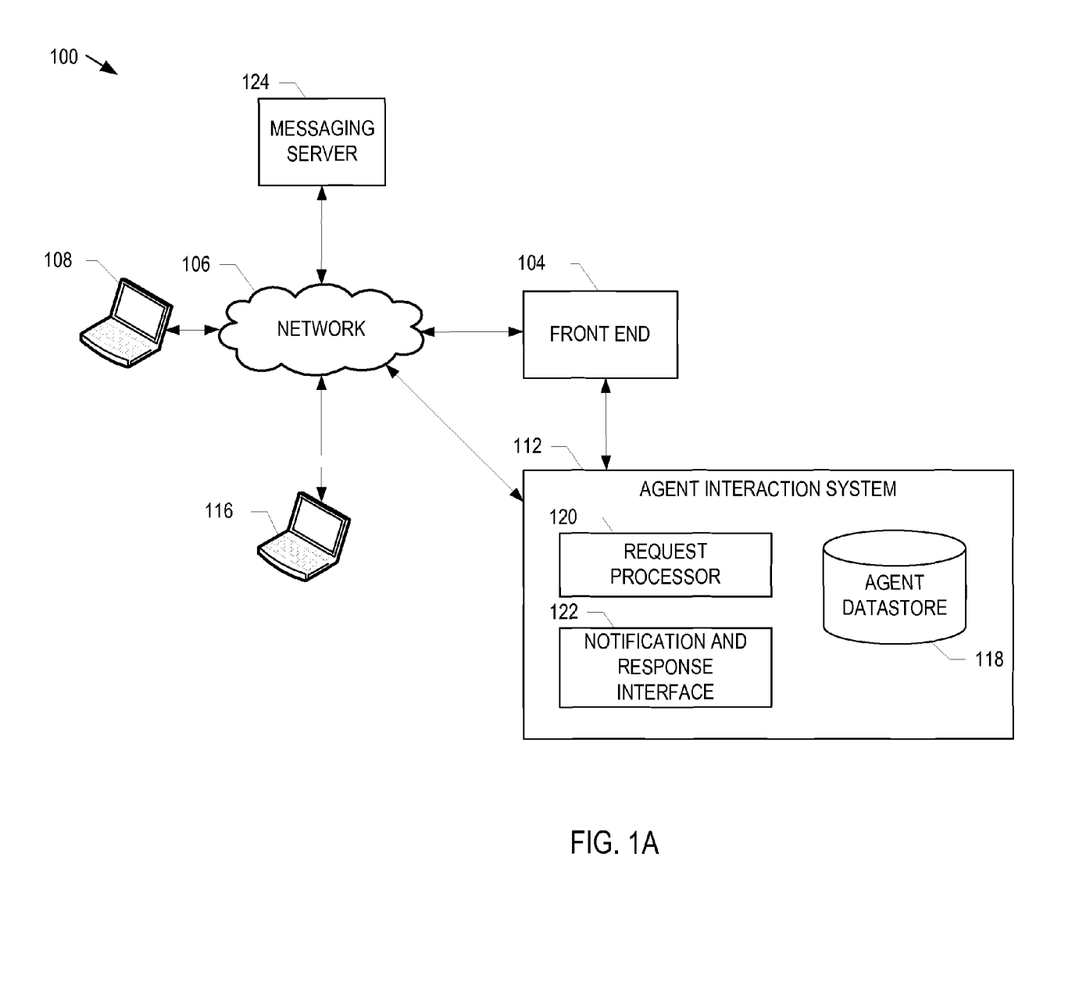
FIG. 1A is a block diagram of an example environment of an agent interaction system.

FIG. 1A is a block diagram of an example environment 100 of an agent interaction system 112. The agent interaction system 112 can provide a user with an agent interaction option such as the opportunity to request additional information that is not included and/or not easily discerned from conventional search result listings. The front end server 104 interfaces with the network 106. The front end server 104 can be, for example, a web server that communicates with one or more client computers over the Internet. The client computer 108 can communicate with the front end server 104 over the network 106. The front end server 104 can, for example, provide hypertext markup language formatted web pages to a web browser of the computer 108. The web browser of the computer 108 can interpret these web pages for display on the computer 108. The displayed web pages can function as a user interface of the agent interaction system 102.

The front end server 104 can accept an agent interaction request from the computer 108 that, for example, ranges from one or more keywords to one or more detailed paragraphs specifying information sought by the user. The agent interaction system 112 includes an agent datastore 118. One or more agents can register with the agent interaction system 112 by, for example, using computer 116 to upload agent data to the agent interaction system 112 for storage in the agent datastore 118. Agents can register using a web browser accessing the front end server 104 that provides an agent interface for requesting and accepting agent data for storage in the agent datastore 118.

Figure 1B:
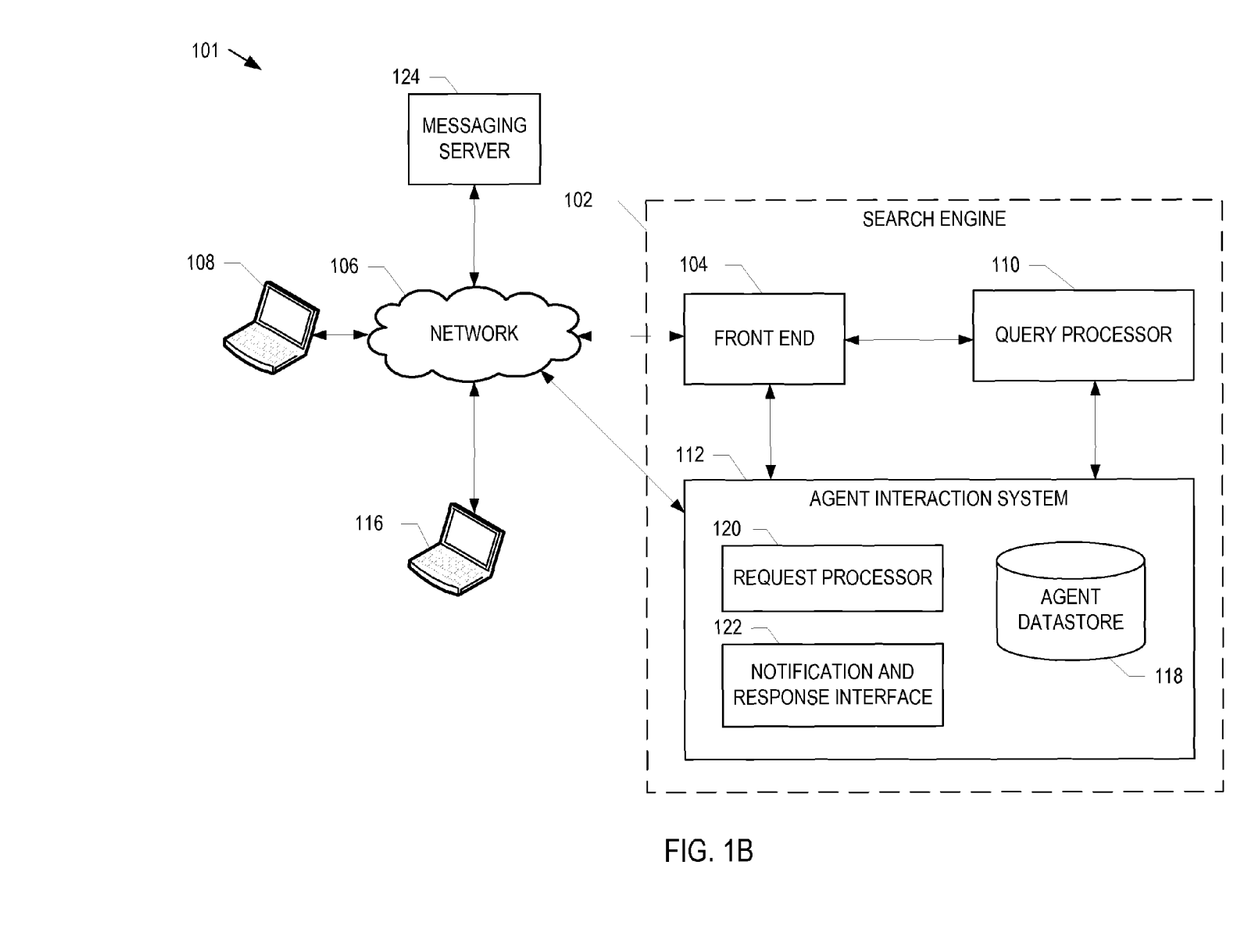
FIG. 1B is a block diagram of an example environment of a search engine including an agent interaction system.

FIG. 1B is a block diagram of an example environment 100 of a search engine 102 including an agent interaction system 112. The search engine 102 includes a front end server 104 that interfaces with the network 106. The front end server 104 can be, for example, a web server that communicates with one or more client computers over the Internet. The client computer 108 can communicate with the front end server 104 over the network 106. The front end server 104 can, for example, provide hypertext markup language formatted web pages to a web browser of the computer 108. The web browser of the computer 108 can interpret these web pages for display on the computer 108. The displayed web pages can function as a user interface of the search engine 102.

The front end server 104 can accept a query from the client computer 108 that includes one or more keywords. The query can be passed on to the query processor 110 for processing. The query processor 110 can identify one or more results corresponding to the query and return the results to the front end server 104 for transmission to the client computer 108. Individual results in a set of results can be ordered according to a ranking score computed by the query processor 110. A result set can be delivered to the client computer 108 as a complete set of results or delivered in segments. For example, the 10 highest ranked results can be delivered first in one web page that includes a link that can be selected by a user to cause the front end server 104 to deliver the next 10 highest ranked results.

The search engine 102 includes an agent interaction system 112. The agent interaction system 112 can provide a search engine user with an agent interaction option such as the opportunity to request additional information that is not included and/or not easily discerned from conventional search result listings. The agent interaction system 112 includes an agent datastore 118. One or more agents can register with the agent interaction system 112 by, for example, using computer 116 to upload agent data to the agent interaction system 112 for storage in the agent datastore 118. Agents can register using a web browser accessing the front end server 104 that provides an agent interface for requesting and accepting agent data for storage in the agent datastore 118.

By registering with the agent interaction system 112, an agent can indicate a willingness or desire to provide additional information to a user that is not included and/or easily discerned from conventional search results. The agent interaction system 112 provides agents with opportunities to assist to a given user that has a particular interest as indicated through user entries into an agent interaction request form, query keywords, and/or a set of query results. Such opportunities are hereinafter referred to as opportunity leads. Opportunity leads can include, for example, a question from a user regarding volunteer opportunities in a designated field and geographical area, or a request regarding further information on the characteristics (e.g., availability or price) of a specified product or service. In the latter case, the opportunity lead presents an opportunity to establish goodwill with the user who may in turn decide to obtain the product or service from an agent responding to the agent interaction request. Opportunity leads presented to a business may be referred to herein as business leads. In the case of business leads, an agent receiving an agent interaction request can, for example, be a representative of a corresponding business such as an owner or employee of the business.

Agents can provide selection criteria to the agent interaction system 112. The selection criteria can indicate one or more areas regarding which and/or circumstances under which they wish to receive agent interaction requests, and this information is stored in the agent datastore 118. For example, selection criteria entered by an agent can indicate a willingness to respond to an agent interaction request regarding the local tax code in a given jurisdiction, the housing market in an indicated city, or an agent interaction request that follows a search query for which the query processor 110 identifies a website associated with the agent in a set of search results. The selection criteria can be used by the request processor 120 of the agent interaction system 112 in identifying, and/or ranking agents for receipt of a given agent interaction request.

Selection criteria can include, for example, keywords to be matched to text of an agent interaction request, keywords to be matched to search query keywords, filtering words, which if found in a user's interaction request and/or search engine query, prevent a request from being sent to the agent, and a website identifier. In some implementations, agents registering with the agent interaction system 112 include a URL identifying a website. The entry of the URL into the agent interaction system can indicate that, if the corresponding website and/or address are identified by the query processor 110 in a set of search results for a given query, the agent wishes to receive a subsequent agent interaction request if such a request follows the delivery of the search results to the search engine user.

Registering agents can also enter one or more contact methods for receipt of agent interaction requests. For example, an agent can enter one or more email addresses, and/or phone numbers corresponding to voice capable devices such as a telephone or voicemail system and/or text capable devices such an SMS capable mobile device or facsimile machine.

In the example system 102 of FIG. 1B, following the entry of one or more keywords by a user of computer 108 to the front end server 104, the query processor identifies a set of search results for the query. The search query keywords and/or the set of search results can be provided to the agent interaction system 112 for a determination as to whether there are any registered agents that correspond to the query and/or query results based on agent information (e.g., agent selection criteria) stored in the agent datastore 118. If one or more registered agents are identified by the request processor 120, the query results can be returned to the computer 108 and presented along with an indication that an agent interaction option is available. In some implementations, a test for other conditions can be performed to determine if the indication that an agent interaction option is available will be presented to the user. Other conditions can include, for example, a lower threshold for a number of search results under which the indication will be displayed, an upper threshold over which the indication will be displayed, and/or a threshold value of a similarity between results in the set (for example, a large number of the results are product listings for the same or similar products).

The indication that an agent interaction option is available can include, for example, a form in which the user of the computer 108 can request agent interaction. The form can be displayed along with the search results or displayed upon the user selecting a corresponding link. The user can enter text into the form detailing a request for information that, for instance, is not included and/or not easily discernable from the search results presented to the user. The form can include a field for the user to enter one or more methods of receiving responses to the user's agent interaction request. For example, a user can enter one or more email addresses, and/or phone numbers corresponding to voice capable devices such as a telephone or voicemail system and/or text capable devices such an SMS capable mobile device or facsimile machine.

An agent interaction request received at the front end server 104 is passed to the agent interaction system 112 where it is processed by the request processor 120. The request processor can identify one or more registered agents in the agent datastore 118 having selection criteria that correspond to the text of the agent interaction request, query keywords, and/or query results. The user's agent interaction request can be transmitted by the notification and response interface 122 to a messaging server such as messaging server 124 for delivery to the identified agents. For example, the messaging server 124 can include email capabilities, and the request can be delivered to an identified agent through email at the email address specified by the agent in the agent datastore 118. In some implementations, the messaging server 124 can perform a text-to-speech conversion and the request can be delivered in a voice format to a telephone or a voicemail system at a phone number specified by the agent that is associated with the agent's record(s) in the agent datastore 118. In some implementations, the messaging server 124 can include text messaging capabilities, and the request can be delivered via SMS or other text messaging format to a mobile device at a phone number specified by the agent that is associated with the agent's record(s) in the agent datastore 118.

In some implementations, the request processor ranks identified agents and interaction requests are transmitted to identified agents based on a ranking score. For example, the interaction request can be sent to a first set of five identified agents having the highest ranking. Then after a period of time, or following a period of non-response by one or more of the first set of five agents, the request can be sent to the next five highest ranked agents.

Requests transmitted to the identified agents can include user inputs to the agent interaction request form and a reply to address to which any response is to be sent. A recipient agent can respond to the request at the reply to address or ignore the request. Any agent replies to the reply to address are sent to the notification and response interface 122. Replies can be forwarded from the notification and response interface 122 to a messaging server such as messaging server 124 for delivery to the requesting user. For example, the messaging server 124 can include email capabilities, and the request can be delivered to the user through email at an email address specified by the user in the agent interaction request form. In some implementations, the messaging server 124 can perform a text-to-speech conversion, and the request can be delivered in a voice format to a telephone or a voicemail system at a phone number specified by the user. In some implementations, the messaging server 124 can include text messaging capabilities, and the request can be delivered via SMS or another text messaging format to a mobile device at a phone number specified by the user in the request form. In some implementations, a user contact address stored in a user account of the agent interaction system 112 or search engine 102 can be used to send agent replies to the user.

The notification and response interface 122 can send agent replies to the user as they are received, and/or can aggregate replies over a period of time. In some implementations, the user contact address is not shared with the identified agents. Maintaining anonymity of the user prevents agents from collecting the user's contact information for later communications such as unsolicited email, telephone calls, or text messages that the user might find disagreeable. An agent contact address can be provided in responses sent to the user to permit the user to contact the agent for further information. The content of agent responses will vary depending on the context of the request and can range from a mere 'yes' or 'no' response to one or more detailed paragraphs.

Figure 2A:
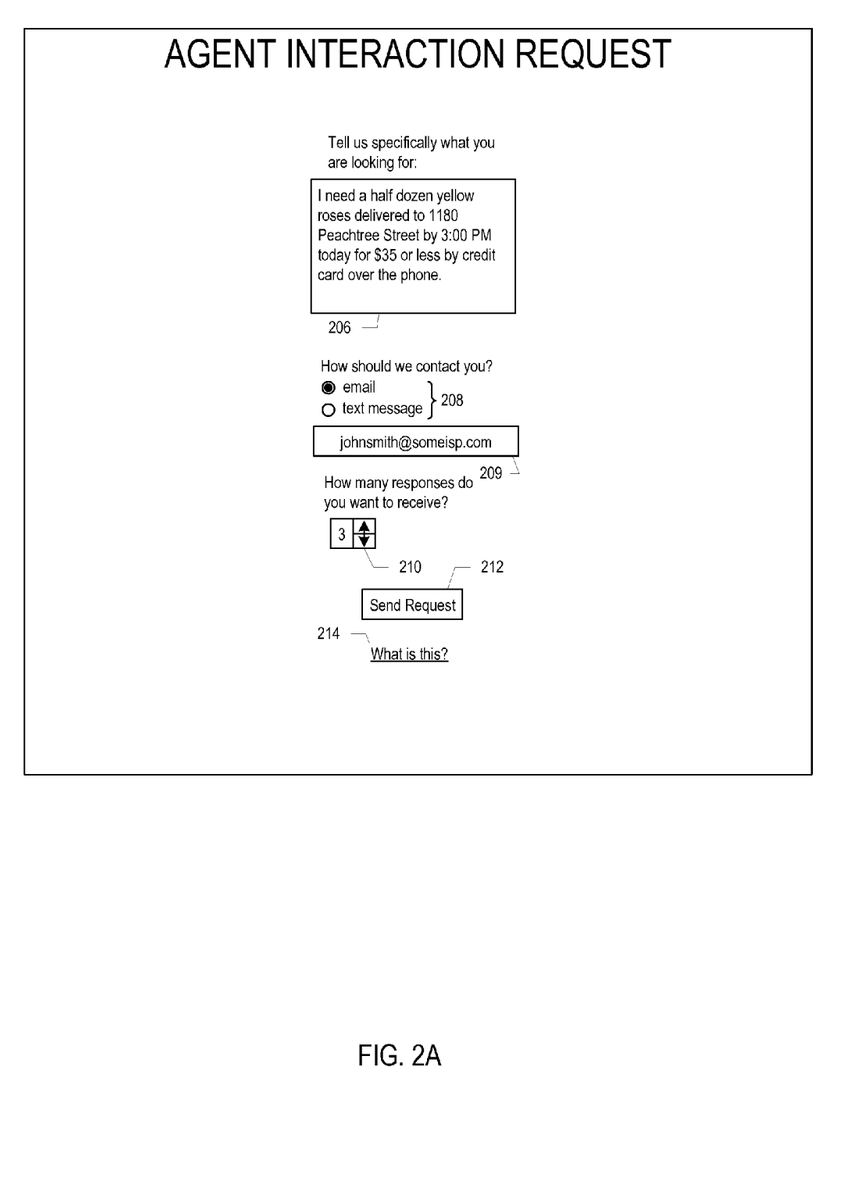
FIG. 2A is an example agent interaction request form.

FIG. 2A is an example agent interaction request form 204. The agent interaction request form 204 permits a user to request information that may not available in or is not easily discernable from conventional search result listings. The form 204 is displayed with the fields completed by a user who, for example, wishes to know if one or more floral businesses can meet the user's detailed requirements for placing an order. The specific request is shown after having been typed into the text area 206. Radio buttons 208 permit a user to select a method for receiving responses to the request. Field 209 accepts a contact address such as an email address or phone number. A number of responses can be designated in selection box 210. After the form is complete, selection of the button 212 can cause the request to be submitted to the agent interaction system 112. Selection of link 214 can cause a description of the agent interaction system 112 to be displayed for review by a user.

Figure 2B:
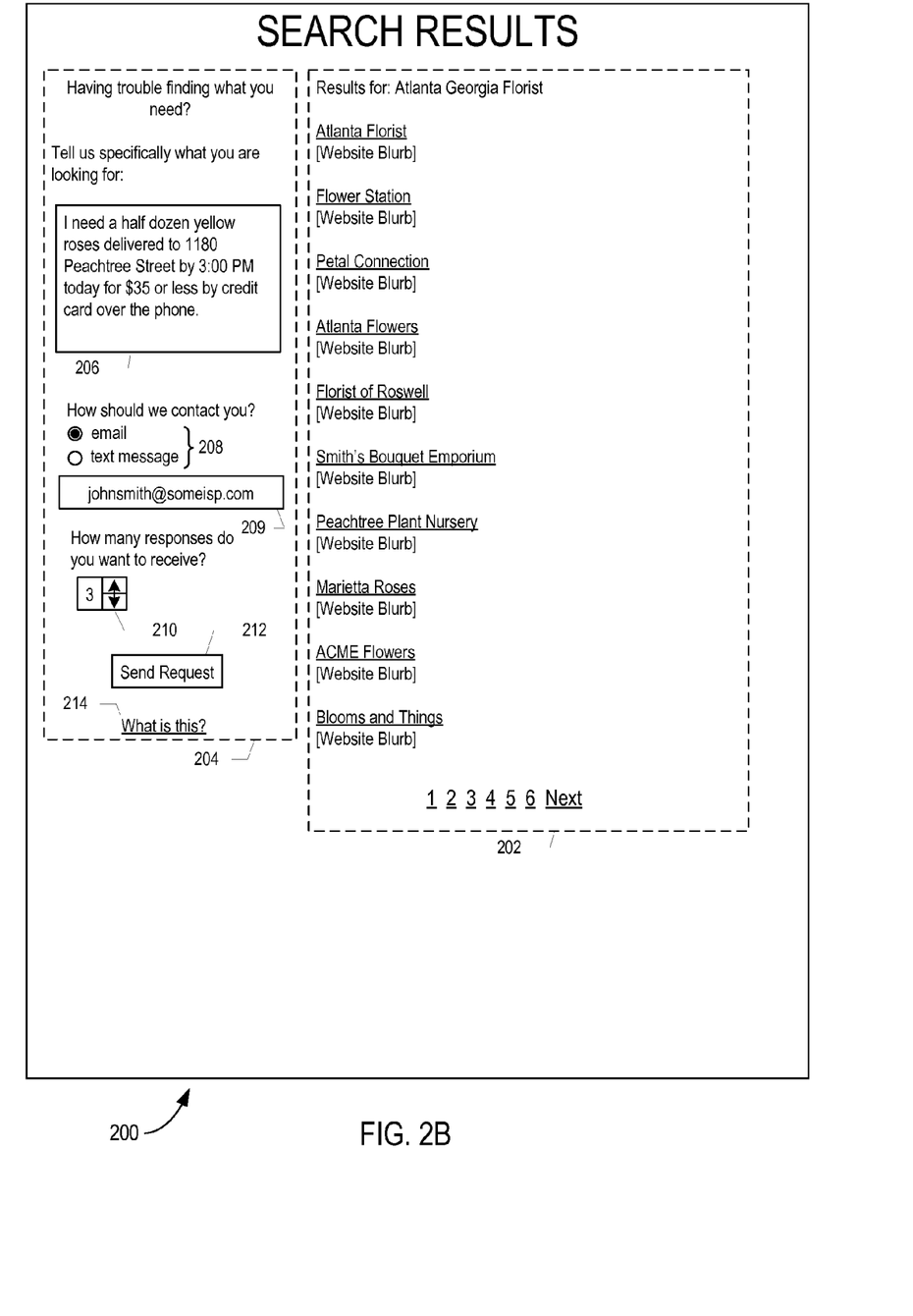
FIG. 2B is an example query results web page including an agent interaction request form.

FIG. 2B is an example query results web page 200 including an agent interaction request form 204. The web page 200 includes a display of results 202 for a query including example keywords 'Atlanta', 'Georgia', and 'florist'. A user performing this search could, for example, be searching for a florist to deliver an order to a local address. Performing a search that includes additional keywords regarding, for example, a type of flowers that the user wishes to order, a desired delivery time, the price the user is willing to pay, or other specifics could lead to the search engine finding no results and/or excluding results that may be of interest to the user. It is likely that this level of specificity is not included on the websites of floral businesses, such that it would also not be included in any index of Internet websites used by the search engine.

In some implementations, the agent interaction request form (such as the form 204) instructs a user to state a set of requirements to which agents can simply respond to either positively or negatively as to whether the stated requirements can be met by the entity (e.g., business) represented by the agent. That is, agents can respond with a yes or no instead of typing a more elaborate text response. Positive responses can be delivered to the requestor by the agent interaction system 112 along with corresponding contact information.

Figure 3:
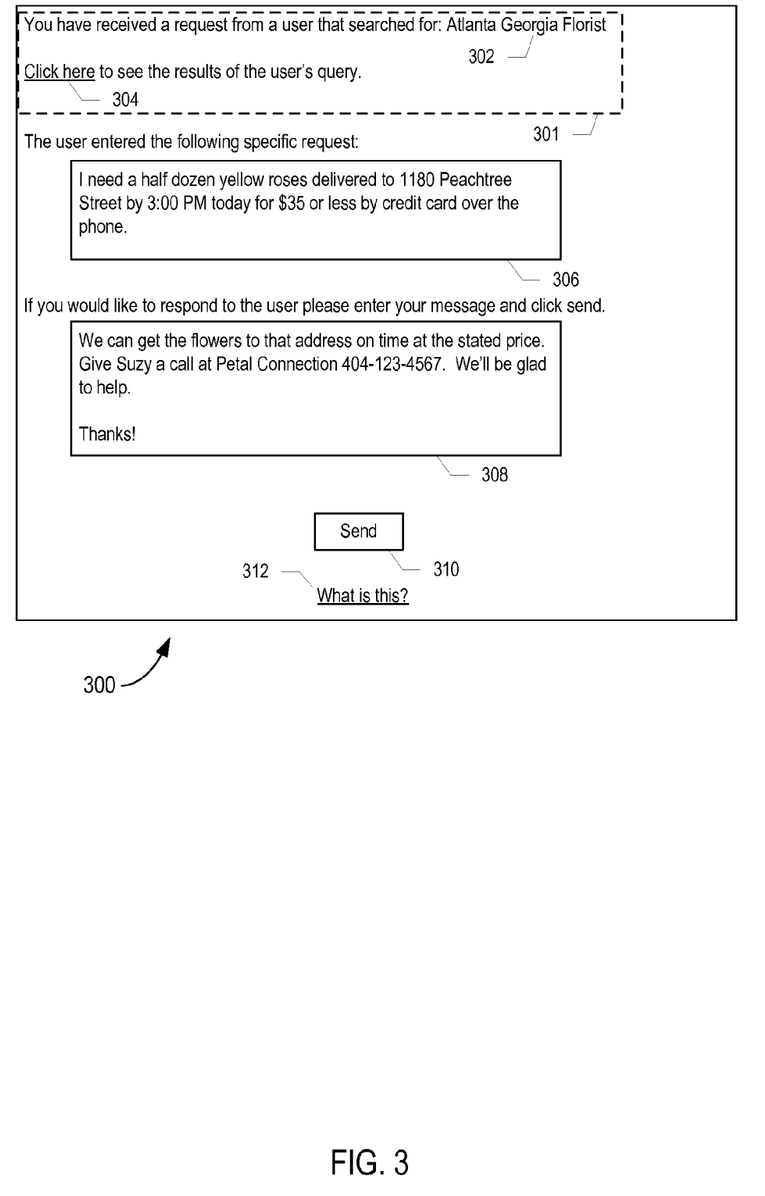
FIG. 3 is an example message representing an agent interaction request sent to a registered agent.

FIG. 3 is an example message 300 representing an agent interaction request sent to a registered agent. The message 300 can be sent by a notification and response interface 122 of an agent interaction system 112 to a registered agent identified by a request processor 120 based on a comparison of agent information, such as agent selection criteria, in an agent datastore 118 with the content of an agent interaction request submitted by a user. The example message shown indicates specific requirements for a flower order that the user would like to place and represents a business lead for the recipient agent and/or a business represented by the agent. The message 300 can be sent to an email address, a telephone or voicemail system in a voice format, and/or a text messaging device such as an SMS capable mobile device. The example message 300 includes optional area 301 that can be included in implementations having an agent interaction system incorporated in a search engine. The query keywords 302 correspond to a search performed by the requesting user prior to making the request. Selection of the link 304 can cause the results of the user's query to be displayed. The query keywords and the query results can provide useful context to an agent in responding to the user's request.

The message 300 includes the request text 306 entered by the requesting user as well as text field 308 for entering response text. The field 308 is shown after having been completed by a registered agent identified by the request processor 120. The response text shown includes contact information so that the user can follow up on the response if the user so desires. In some implementations, the contact information can be automatically included in the response based on information stored in the agent datastore 118 that is associated with the responding agent. Selection of the button 310 can cause the response to be sent to the agent interaction system 112 for forwarding to the requesting user. Selection of the link 312 can cause information regarding the agent interaction system 112 to be displayed. For example, the recipient can be provided with directions for accessing the agent interaction system 112 and/or provided with options for preventing the agent interaction system 112 from sending any further messages to the agent's address.

Figure 4:
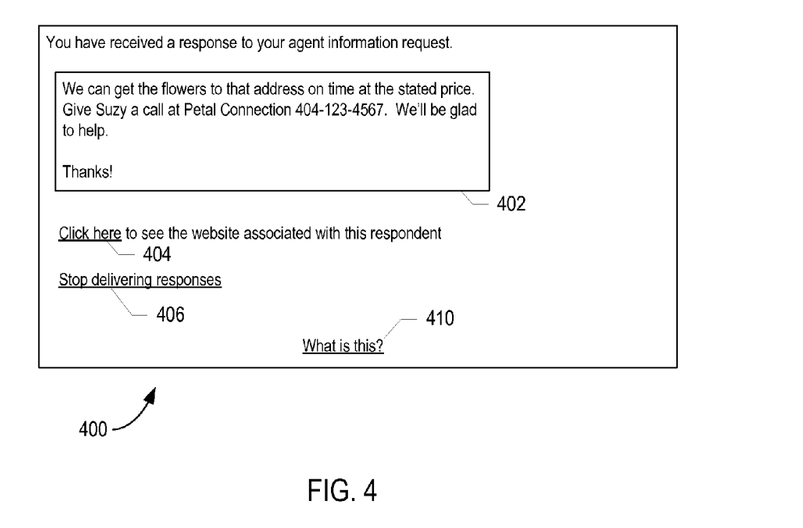
FIG. 4 is an example agent interaction response message.

FIG. 4 is an example agent interaction response message 400. The message 400 can be sent to a requesting user to inform the user that a registered agent has responded to the user's agent interaction request. The message 400 includes the response text 402 entered by the responding agent. Selection of the link 404 can cause a website associated with the responding agent (if any) to be displayed. Selection of the link 406 can direct the agent interaction system 112 to stop delivering any further responses to the user, and selection of the link 410 can provide further information to the user regarding the agent interaction system 112.

FIGS. 2, 3, and 4 represent example web pages and corresponding messages in an example use of the agent interaction system to obtain additional information regarding local florists. The examples should not be considered limiting. The agent interaction system 112 can be used to obtain information not included in a set of conventional search results and/or not easily discerned from search result listings regarding a broad range of topics and/or keyword searches. Information can be obtained from registered agents representing themselves, businesses, non-profit organizations, and/or other entities.

Figure 5:
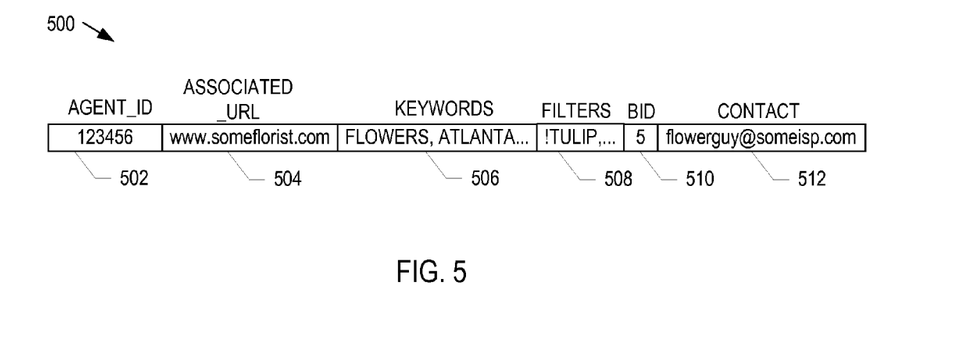
FIG. 5 shows an example record of the agent datastore.

FIG. 5 shows an example record 500 of the agent datastore 118. Record 500 is an example and some implementations omit one or more of the fields shown, and/or include additional fields. The sample record 500 includes an agent identifier field 502. The agent identifier field 502 can store a unique identifier assigned to each registered agent by the agent interaction system 112. The associated URL field 504 can store a website URL that is associated with the agent record. The URL can be, for example, the address of a website corresponding to a business employing the registered agent. The keyword field 506 includes keywords for use by the request processor in identifying agents for a given agent interaction request. Keywords in the keywords field 506 can be entered by an agent, and/or extracted by a search engine, such as search engine 102, from a website identified by the URL in the associated URL field 504. The filters field 508 can include one or more filters for use by the request processor in identifying agents for a given agent interaction request. The example record 500 includes "!TULIP" in the filter field 508. This filter can indicate, for example, that the agent interaction system 112 should not send an agent interaction request that includes a reference to a 'tulip' to the registered agent corresponding to the example record. The agent can enter such a filter, for example, because the floral business represented by the agent does not stock and sell tulips. The bid field 510 can include an amount that the registered agent and/or the entity represented by the agent offers to pay for receipt of the opportunity lead represented by an agent interaction request. The use of the bid field 510 will be discussed in more detail below. The contact field 512 can include an address where agent interaction requests, for which the agent has been identified, should be sent.

Figure 6:
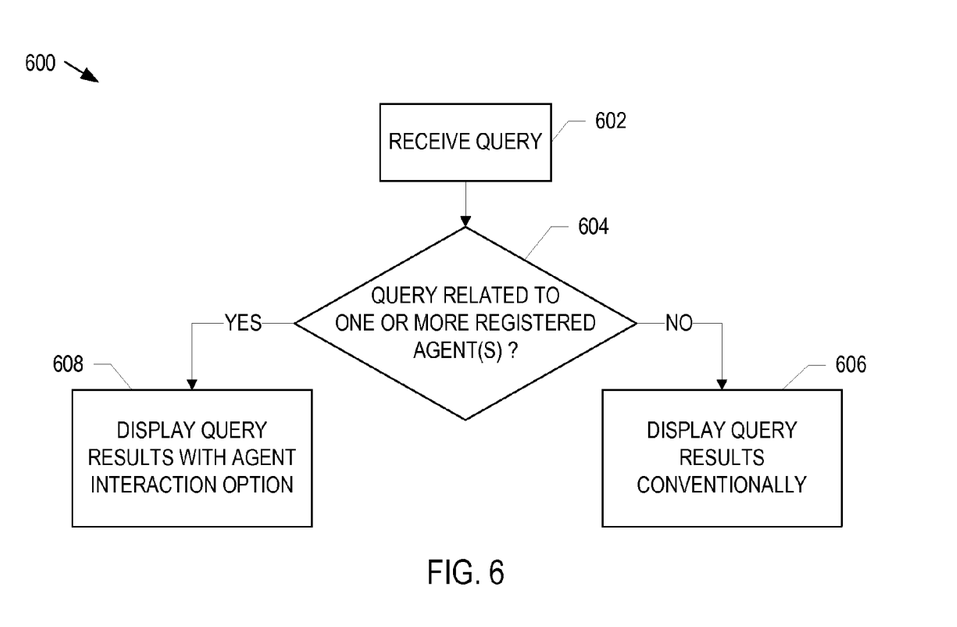
FIG. 6 is a flowchart of an example method for determining whether an agent interaction option is to be presented with search results.

FIG. 6 is a flowchart of an example method for determining whether an agent interaction option is to be presented with search results. A query including one or more keywords is received at the search engine 102 (602). One or more query keywords and/or a set of search results identified by the query processor 110 can be passed from the query processor 110 to the agent interaction system 112. The request processor 120 can determine, based on the one or more query keywords and/or the set of search results identified by the query processor 110, whether or not there are any agent records stored in the agent datastore 118 that have selection criteria corresponding to the query (604). If no agents are found that have matching selection criteria, the query results are displayed conventionally (i.e. without agent interaction options) (606). If one or more registered agents are identified having selection criteria that match the query, the query results are displayed with an agent interaction option (608). In some implementations, it is possible that one or more registered agents are identified for a query where no query results are identified. In that case, the fact that no matching query result was found is reported to the user and agent interaction options are displayed along with the report.

Figure 7:
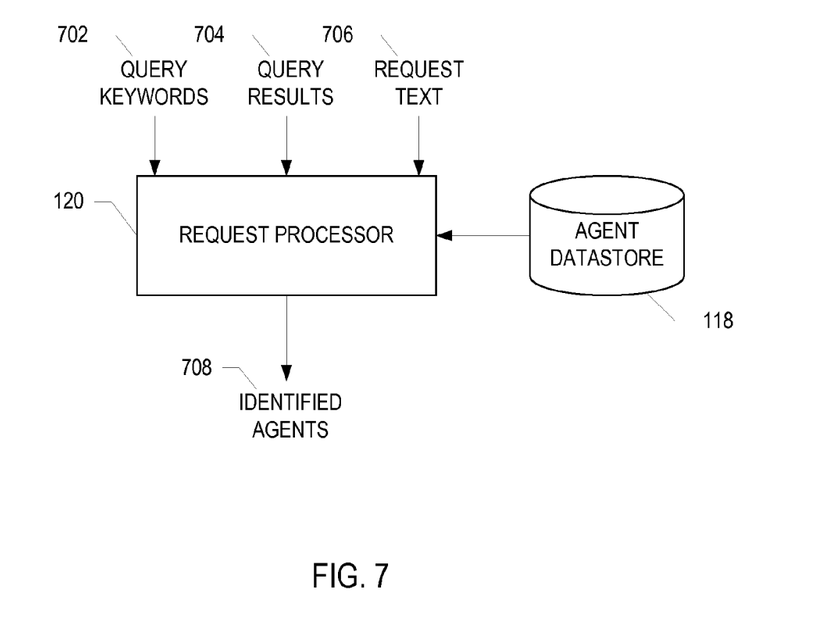
FIG. 7 is a block diagram of an example request processor.

FIG. 7 is a block diagram of an example request processor 120. Upon receiving a request for agent interaction, the request processor outputs a set of identified agents 708 based on records in the agent datastore 118, request text 706 entered by the user into the agent interaction form, any query keywords 702 of a requesting user's search query, and/or query results 704 of that query. In a standalone use (e.g., an agent interaction system that is not incorporated in a search engine, or an agent interaction system incorporated in a search engine that is accessed directly by a user for making an agent interaction request without first performing a search) of the agent interaction system 112, query keywords 702 and query results 704 are not used by the request processor in identifying agents. In some implementations, the identified agents 708 are ranked by the request processor 120 based on one or more of the inputs to the request processor 120.

Figure 8:
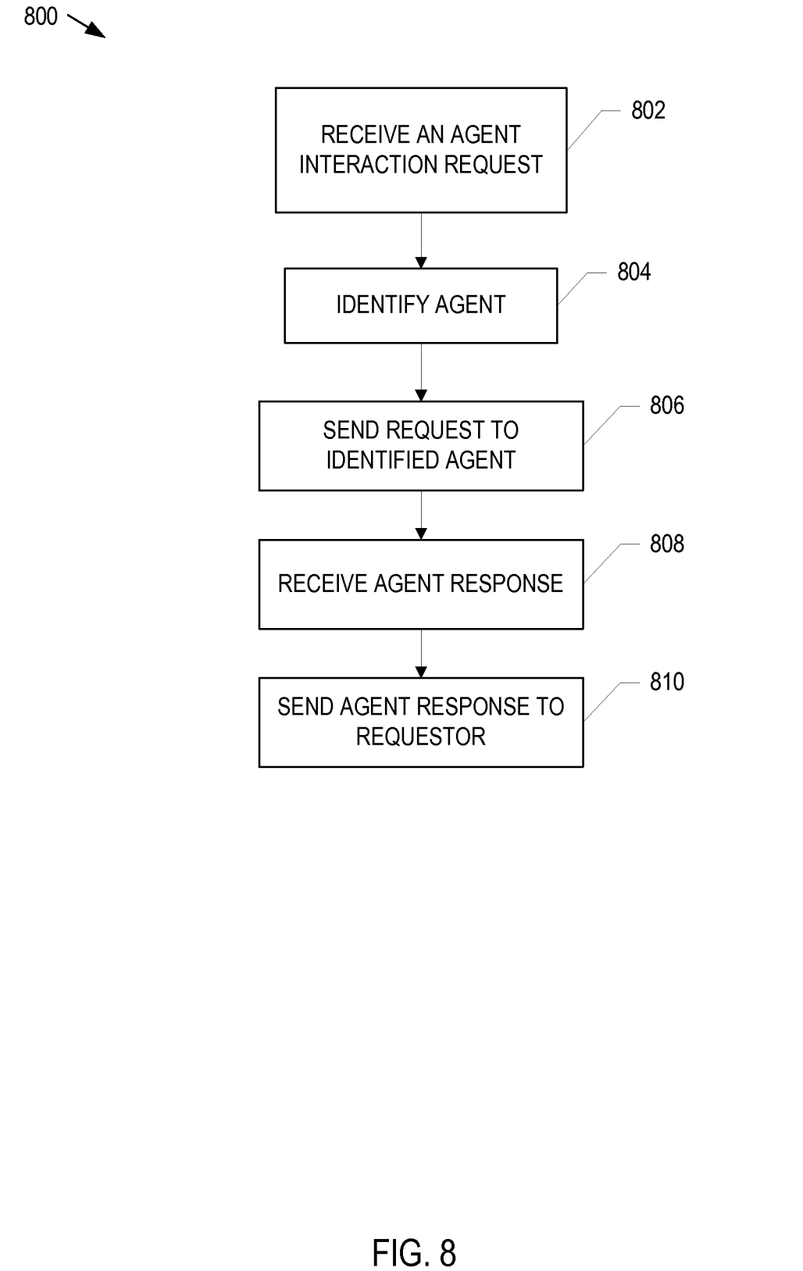
FIG. 8 is a flowchart of an example method for providing an agent interaction response.

FIG. 8 is a flowchart of an example method 800 for providing an agent interaction response. A request for agent interaction is received (802). For instance, a request can be received from a user who submits a request using the form 204. An agent having selection criteria corresponding to the request is identified (804). For example, the request processor 120 can identify one or more agents based on agent selection criteria in the agent datastore 118 and content of the agent interaction request, a user search engine query, and/or query results. The agent interaction request is sent to the identified agent (806). For example, a message, such as message 300, can be sent to the identified agent. If the agent decides to respond, one or more fields can be completed and the response can be sent back to the agent interaction system 112. The response is received at the agent interaction system 112 from the agent (808). The response can include the information requested by the user. For example, the response can include an indication whether the agent and/or the entity represented by the agent has a certain product in stock. The agent response is sent to the requesting user 810. In some implementations, only positive responses (e.g., responses that include the requested information and not responses that state that an agent is unable to help the requestor) are returned to the requesting user.

Figure 9:
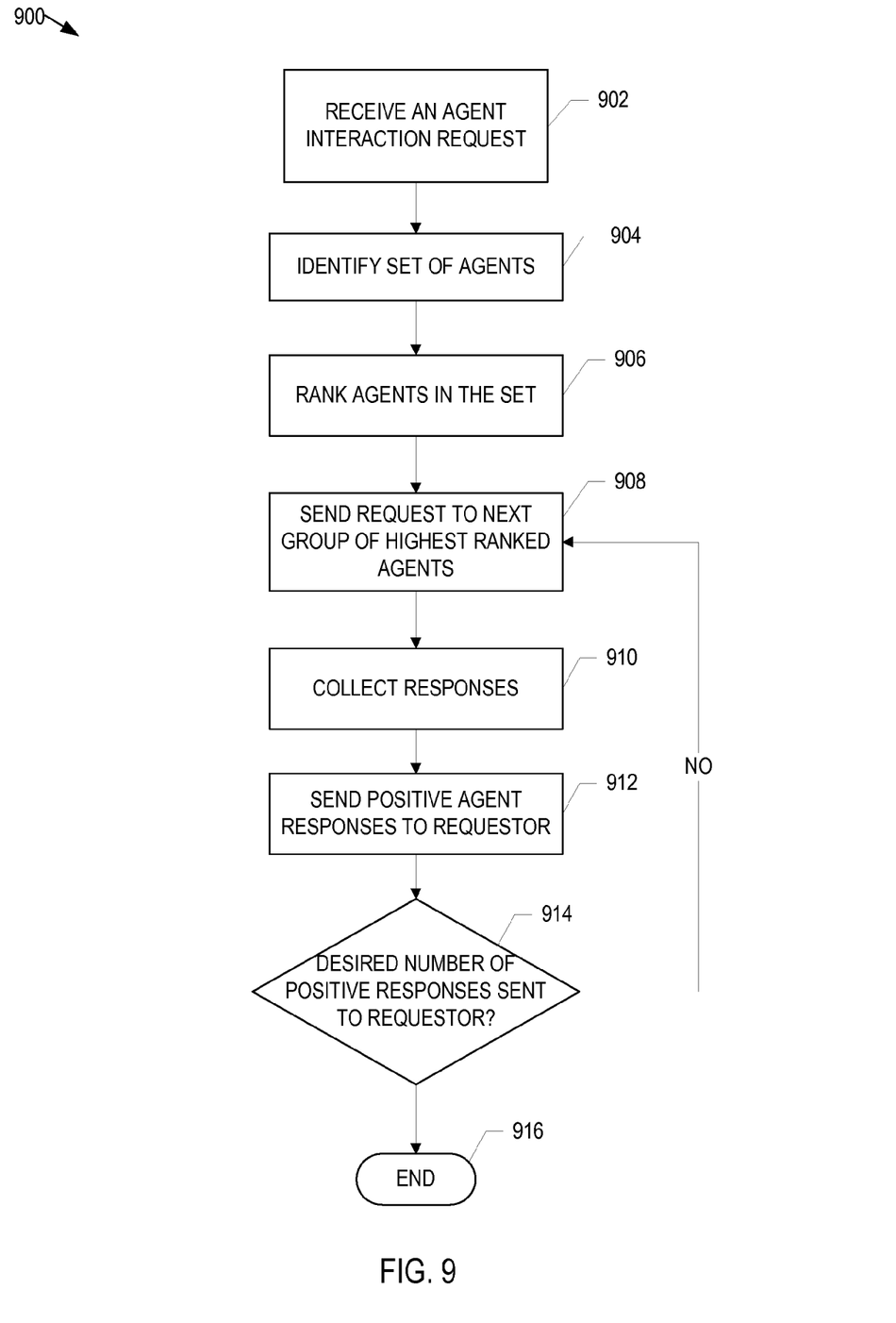
FIG. 9 is a flowchart of an example method of sending agent interaction requests to groups of agents in an order based on an agent ranking.

FIG. 9 is a flowchart of an example method 900 of sending agent interaction requests to groups of agents in an order based on an agent ranking. A request is received for agent interaction (902). A set of agents is identified (904). Identified agents are ranked (906). Agents can be ranked, for example, based on a how well the selection criteria in the agent datastore 118 matches query keywords entered by the requesting user, a set of query results, the content of the user's request, and/or an agent bid amount.

In some implementations, registered agents can provide one or more bid amounts that the agent and/or the entity represented by the agent is willing to pay for receipt of an opportunity lead (e.g., an agent interaction request matching the agent's selection criteria in the agent datastore 118). In some implementations a single bid amount is entered corresponding to an amount the agent or represented entity is willing to pay for delivery of any opportunity lead for which the agent is identified by the request processor 120. In other implementations, multiple bids are entered that correspond to respective targeted keywords. A higher bid can be entered, for example, for opportunity leads that that include a keyword that is strongly correlated to the area of expertise of the agent and/or a business or activity of the entity represented by the agent. While a lower bid can be entered for a keyword that has a weaker correlation. Bid amounts entered by an agent can be stored in the agent datastore 118 and associated with an agent identifier. An agent ranking in a set of agents identified by the request processor 120 can be based, at least in part, on bid amounts associated with the respective agents.

Following the ranking of the agents, the request can be sent to a first group of agents that includes the highest ranked agents (908). For example, if the group size is three, the request can be sent to the first, second, and third highest ranked agents. Agent responses are collected (910), and positive agent responses are sent to the requesting user (912). The positive responses are counted, and compared to a threshold number of responses (914) (for example, a number of responses designated by the requesting user). If the threshold is met, the process ends (916). If the threshold is not met, the request is sent to a next group of highest ranked agents (908). For instance, for a group size of three, the request is sent to the fourth, fifth, and sixth highest ranked agents.

Figure 10:
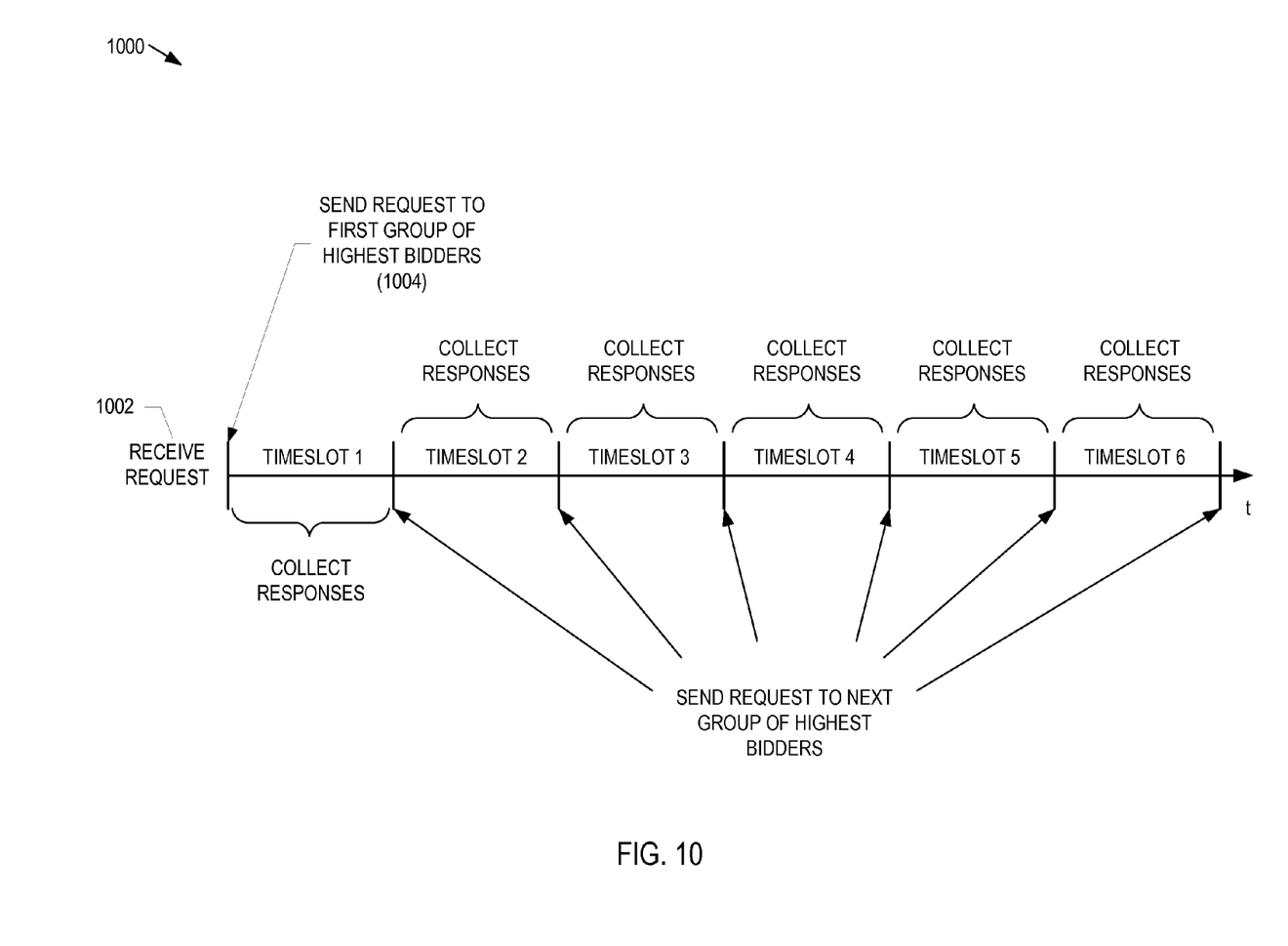
FIG. 10 shows an example timeline segmented into a number of timeslots during which a given request can be delivered to one or more agents.

FIG. 10 shows an example timeline 1000 segmented into a number of timeslots during which a given request can be delivered to one or more agents. In the example of FIG. 10, agents are ranked based on a bid amount entered by the agents and stored in the agent datastore 118. A request for agent interaction is received at an agent interaction system 112 (1002), and a number of agents are identified and ranked based on an amount of respective bids stored in the agent datastore 118. The request is sent to a first group of agents that are the highest bidders in the set of identified agents at the beginning of a first timeslot (timeslot 1) (1004).

During timeslot 1, responses from the first group of agents are collected by the agent interaction system 112. Responses can be forwarded on to the requesting user as the responses are received, or aggregated into a composite response for the timeslot. At the end of the first timeslot, any aggregated responses are sent to the requesting user. The agent interaction request is then sent to the next group of highest bidding agents in the set of identified agents to begin a second timeslot (timeslot 2). During timeslot 2 responses from the second group of agents are collected by the agent interaction system 112. As in timeslot 1, responses can be forwarded on to the requesting user as the responses are received, or aggregated into a composite response for the timeslot. At the end of the timeslot 2, any aggregated results are sent to the requesting user. The interaction request is then sent to a next group of highest bidding agents to start timeslot 3. This process can continue for timeslots 3, 4, 5, and 6 and beyond until a threshold number of positive responses are sent to the requesting user or a maximum amount of time for delivering responses to the requesting user expires.

Timeslots 1 through 6 can all have the same length, or the length can vary between timeslots. For example, earlier timeslots can be shorter than later timeslots. In some implementations, timeslot length is based on a number of identified agents. For example, if many agents that have selection criteria matching a given request are found, timeslot lengths can be shorter than timeslot lengths in instances where fewer agents are identified.

Figure 11:
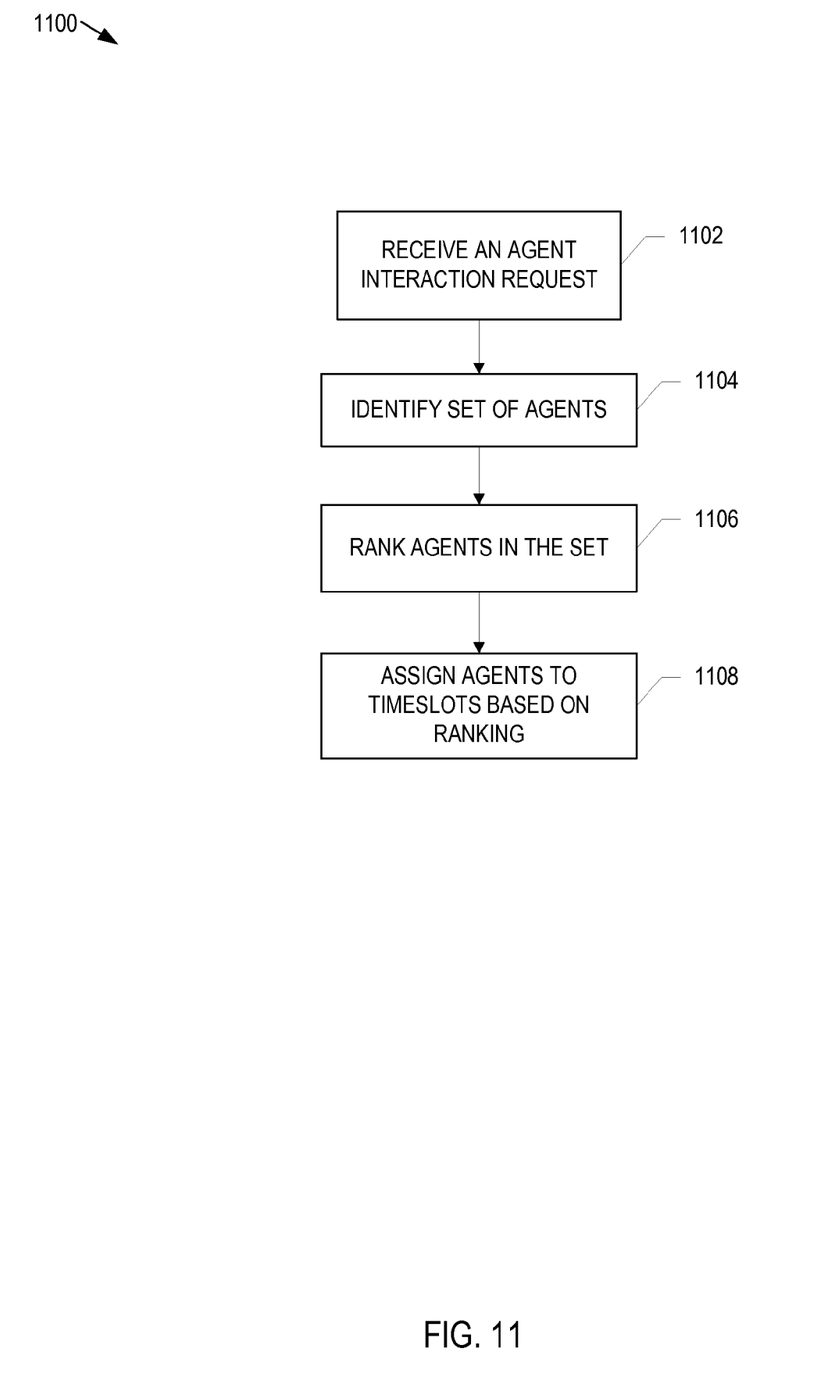
FIG. 11 is a flowchart of an example method for assigning identified agents to timeslots.

FIG. 11 is a flowchart of an example method 1100 for assigning identified agents to timeslots. A request is received for agent interaction (1102). A set of agents is identified (1104). The agents in the set of identified agents are ranked (1106), for example based on a bid amount stored in the agent datastore and associated with a given agent. The identified agents are assigned a timeslot based on the ranking (1108). The assignment can be based on an assignment algorithm. In some implementations, the assignment algorithm can assign the first 'x' highest bidders to a first timeslot, assign the next 'x' bidders to a second timeslot, and so forth, where 'x' is a constant integer. In another embodiment, the number of agents assigned to timeslots can vary. For example, a mean bid value of all identified agents can be computed, and/or statistical groupings of agents can be created based on their bid amounts. For example, agents can be grouped according to a deviation of their bid amount from the mean bid amount. In some implementations, if one identified agent has a corresponding bid amount that is spread well beyond other agent bids in the set, the first timeslot can be allocated solely to that agent. In some implementations, if a number of identified agents have identical bid amounts or bid amounts with little or no statistical variation between them; those identified agents are grouped together and assigned to the same timeslot. When a lead is delivered to an agent, the agent's bid amount can be charged to the an agent interaction account associate with that agent.

In other implementations, a lead can be sent to a set of identified agents, and the agents can read the lead prior to entering a bid amount and entering a response. Agent responses to the lead can be collected by the query results enhancement system and provided to the requesting user based on the respective agent bids. For example, the responses of agents with higher bid amounts can be delivered first followed later by responses from agents with progressively lower bid amounts.

Assigning timeslots based on agent bids creates a market for business leads and other opportunities presented by agent interaction requests. The value of a given lead is initially high when the lead is new and decreases as time passes. Agents value earlier access to the requesting user while the user's interest is likely higher and the requesting user has likely not had contact with as many other responding agents. Requesting users are presented with specific sought for information and are placed in contact with agents that can help them further if desired. This information can be obtained conveniently without making a number of telephone calls, surrendering personal contact information, and without the user subjecting themselves to "hard sell" interactions that the user may find uncomfortable.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer implemented method comprising:
presenting a search results page that includes one or more search results responsive to a search query and an agent interaction option to a user of a client device, the agent interaction option including a region for inputting an agent interaction request;
receiving the agent interaction request, wherein the agent interaction request includes contact information associated with the user and user input text describing additional information associated with at least one of the one or more search results and wherein the agent interaction request is different from the search query;

identifying a set of agents based at least on agent selection criteria in an agent datastore and the text to provide one or more responses to the agent interaction request, wherein the one or more responses are different from the one or more search results;

ranking the set of identified agents;

assigning each of one or more identified agents from the set of identified agents to a particular timeslot of a plurality of timeslots based on the ranking of the identified agents;

sending the agent interaction request to one or more identified agents assigned to a first timeslot; and following the end of a time period represented by the first timeslot, sending the agent interaction request to one or more identified agents assigned to a second timeslot in response to determining that a threshold number of agent responses were not received from the one or more identified agents assigned to the first timeslot.

2. The method of claim 1, wherein:
ranking the set of identified agents comprises ranking the identified agents based on respective bids.

3. The method of claim 2, wherein:
the respective bids are monetary values associated with the identified agents in an agent datastore, a given bid representing an amount the corresponding agent offers to pay for receipt of an agent interaction request.

4. The method of claim 1, further comprising:
following the end of a time period represented by the second timeslot, sending the agent interaction request to one or more identified agents assigned to a third timeslot.

5. The method of claim 1, wherein:
a length of the first timeslot is based on a statistical deviation of a bid of an identified agent assigned to the first timeslot from a statistical mean of the bids of the set of identified agents.

6. The method of claim 1, wherein:
a number of identified agents assigned to a given timeslot is based on a statistical grouping of identified agents based on respective bids.

7. The method of claim 1, wherein identifying the set of agents further includes using one or more query keywords from the search query and one or more of the search results.

8. A computer implemented method, comprising:
presenting a search results page that includes one or more search results responsive to a search query and an agent interaction option to a user of a client device, the agent interaction option including a region for inputting an agent interaction request;

following presentation of the agent interaction option, receiving the agent interaction request including contact information associated with the user and received user input request text describing additional information associated with at least one of the one or more search results from the client device, wherein the agent interaction request is different from the search query;

identifying one or more agents based at least on agent selection criteria in an agent datastore and the text to provide one or more responses to the agent interaction request, wherein the one or more responses are different from the one or more search results, the agent selection criteria including a bid amount;

assigning each of one or more identified agents from the set of identified agents to a particular timeslot of a plurality of timeslots based on a ranking of the identified agents;

sending the request text to one or more identified agents assigned to a first timeslot;

receiving a response to the request text from at least one identified agent;

sending the response to the request text to the user based on user contact data and following the end of a time period represented by the first timeslot, sending the request text to one or more identified agents assigned to a second timeslot in response to determining that a threshold number of agent responses were not received from the one or more identified agents assigned to the first timeslot.

9. The method of claim 8, wherein:
identifying one or more agents based on agent selection criteria comprises comparing the agent selection criteria with the request text.

10. The method of claim 8, wherein:
identifying one or more agents based on agent selection criteria comprises comparing the agent selection criteria with one or more keywords included in the search query.

11. The method of claim 8, wherein:
identifying one or more agents based on agent selection criteria comprises comparing the agent selection criteria with the one or more search results.

12. The method of claim 8, wherein:
identifying one or more agents based on agent selection criteria comprises identifying a first agent if a website associated with the first agent in an agent datastore is included in the one or more search results.

13. The method of claim 8, further comprising:
receiving agent registration information including agent selection criteria from a plurality of agents; and
storing the agent registration information in an agent datastore,
wherein identifying one or more agents based on agent selection criteria includes retrieving agent selection criteria from the agent datastore.

14. The method of claim 8, further comprising:
ranking the one or more identified agents, and
wherein sending the request text to one or more identified agents comprises sending the request text to an identified agent at a time that is determined based on a rank of the identified agent.

15. The method of claim 14, wherein:
the rank is based on a bid amount associated with the identified agent.

16. The method of claim 8, wherein:
the user contact data comprises contact data associated with a logged in user stored prior to receipt of the agent interaction request.

17. The method of claim 8, wherein the contact information includes an email address or a telephone number.

18. The method of claim 8, wherein user contact data is maintained in confidence during the sending of the request text to the one or more identified agents.

19. The method of claim 8, wherein:
sending the request text to an identified agent comprises sending a message in an email, voice, or text message format.

20. The method of claim 8, wherein:
sending the response to the request text to the user comprises sending a message in an email, voice, or text message format.

21. The method of claim 8, wherein sending the response to the request text to a user based on user contact data comprises:
sending a communication to the user including multiple responses to the request text received from a respective number of the one or more identified agents.

22. A computer implemented method, comprising:
presenting a search results page that includes one or more query results and an agent interaction option to a user of a client device in response to receiving a query including one or more keywords, the agent interaction option including a region for inputting an agent interaction request;
following presentation of the agent interaction option, receiving the agent interaction request including received user input request text and contact information provided by the user from the client device, wherein the agent interaction request is different from the query;
identifying one or more agents based on a comparison of agent selection criteria with at least one of the one or more keywords, the one or more query results, and the request text;
sending the request text to a plurality of identified agents assigned to a first timeslot of a plurality of timeslots;
receiving a response to the request text from a first identified agent of the plurality of identified agents assigned to the first timeslot;
sending the response to the request text to the user based on the contact information associated with the user, wherein the response is different from the one or more query results; and
following the end of the first time period represented by the first timeslot, sending the request text to a second identified agent assigned to a second timeslot in response to determining that a threshold number of agent responses were not received from the plurality of identified agents assigned to the first timeslot.

23. The method of claim 22, wherein:
identifying one or more agents based on agent selection criteria comprises identifying a first agent if a website associated with the first agent in an agent datastore is included in the one or more query results.

24. The method of claim 22, further comprising:
receiving agent registration information including agent selection criteria from a plurality of agents;
storing the agent registration information in an agent datastore; and
wherein identifying one or more agents based on agent selection criteria includes retrieving agent selection criteria from the agent datastore.

25. The method of claim 22, further comprising:
ranking the one or more identified agents;
wherein sending the request text to an identified agent comprises sending the request text to the identified agent at a time that is determined based on a rank of the identified agent.

26. The method of claim 25, wherein:
the rank is based on a bid amount associated with the identified agent.

27. The method of claim 22, wherein the response to the request text includes contact information associated with the identified agent.

28. The method of claim 22, wherein sending the response comprises:
emailing the response to the user, text messaging the response to the user, or calling a phone number associated with the user.

* * * * *